US011810383B2

(12) United States Patent
Patel et al.

(10) Patent No.: US 11,810,383 B2
(45) Date of Patent: Nov. 7, 2023

(54) SYSTEM AND METHOD FOR DETERMINATION OF LABEL VALUES IN UNSTRUCTURED DOCUMENTS

(71) Applicant: Tata Consultancy Services Limited, Mumbai (IN)

(72) Inventors: Devang Jagdishchandra Patel, Mumbai (IN); Prabhat Ranjan Mishra, Mumbai (IN); Ketkee Pandit, Mumbai (IN); Ankita Gupta, Mumbai (IN); Chirabrata Bhaumik, Kolkata (IN); Dinesh Yadav, Mumbai (IN); Amit Kumar Agrawal, Kolkata (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 399 days.

(21) Appl. No.: 17/100,205

(22) Filed: Nov. 20, 2020

(65) Prior Publication Data

US 2021/0201018 A1   Jul. 1, 2021

(30) Foreign Application Priority Data

Nov. 21, 2019   (IN) .............................. 201921047655

(51) Int. Cl.
*G06V 30/414* (2022.01)
*G06F 40/279* (2020.01)
(Continued)

(52) U.S. Cl.
CPC .......... *G06V 30/414* (2022.01); *G06F 16/958* (2019.01); *G06F 18/214* (2023.01);
(Continued)

(58) Field of Classification Search
CPC ..... G06V 30/10; G06F 16/958; G06F 40/279; G06F 40/30; G06N 20/00
(Continued)

(56) References Cited

U.S. PATENT DOCUMENTS 5,892,843 A * 4/1999 Zhou ...................... G06V 30/40
382/176
9,552,516 B2   1/2017 Janssen, Jr.
(Continued)

FOREIGN PATENT DOCUMENTS

WO   WO-2010022185 A1 * 2/2010 ......... G05D 23/1905

OTHER PUBLICATIONS

Davis et al., "Deep Visual Template-Free Form Parsing", arXiv:1909.02576v2 [cs.CV] Sep. 18, 2019 (Year: 2019).*
(Continued)

*Primary Examiner* — Randolph I Chu
(74) *Attorney, Agent, or Firm* — Finnegan, Henderson, Farabow, Garrett & Dunner LLP

(57) ABSTRACT

This disclosure relates generally to method and system for determining label value for labels in unstructured documents. Typical systems have challenge in understanding variations in layout of unstructured documents and extract information therefrom. The disclosed method and system facilitate systematically identifying sections and bounding boxes in the page images, taking image portion of the bounding boxes and extracting labels and label values therefrom. In case the label values are not present in the same bounding box having the label, the neighboring labels are examined for the matching label values. The system also obtains label-label value pairs from the document by utilizing a trained deep learning model, and compares the output with the label-label value pairs extracted earlier. An aggregated confidence score is assigned to the text in the bounding box.

19 Claims, 6 Drawing Sheets

(51) Int. Cl.
| | |
|---|---|
| *G06V 30/416* | (2022.01) |
| *G06F 18/22* | (2023.01) |
| *G06V 30/10* | (2022.01) |
| *G06F 16/958* | (2019.01) |
| *G06N 20/00* | (2019.01) |
| *G06F 40/30* | (2020.01) |
| *G06N 5/04* | (2023.01) |
| *G06Q 30/0201* | (2023.01) |
| *G06F 18/214* | (2023.01) |
| *G06Q 30/016* | (2023.01) |

(52) U.S. Cl.
CPC ............ *G06F 18/22* (2023.01); *G06F 40/279* (2020.01); *G06F 40/30* (2020.01); *G06N 5/04* (2013.01); *G06N 20/00* (2019.01); *G06Q 30/0201* (2013.01); *G06V 30/416* (2022.01); *G06Q 30/016* (2013.01); *G06V 30/10* (2022.01)

(58) Field of Classification Search
USPC ......... 382/155–160, 181–182, 187, 229, 321
See application file for complete search history.

(56) References Cited

U.S. PATENT DOCUMENTS

| | | | |
|---|---|---|---|
| 9,613,267 B2 | 4/2017 | Déjean et al. | |
| 10,395,772 B1* | 8/2019 | Lucas | G06F 18/2431 |
| 10,878,270 B1* | 12/2020 | Cao | G06V 10/82 |
| 11,176,443 B1* | 11/2021 | Selva | G06F 18/25 |
| 11,580,763 B2* | 2/2023 | Ammar | G06V 30/153 |
| 11,600,084 B2* | 3/2023 | Zhao | G06V 20/63 |
| 11,620,733 B2* | 4/2023 | Ma | G06V 30/414 |
| | | | 382/154 |
| 2011/0249905 A1 | 10/2011 | Singh et al. | |
| 2015/0199598 A1* | 7/2015 | Iams | G06V 10/245 |
| | | | 434/358 |
| 2015/0302084 A1* | 10/2015 | Stewart | G06F 16/35 |
| | | | 707/776 |
| 2016/0371246 A1* | 12/2016 | Deepak | G06V 10/22 |
| 2019/0354818 A1* | 11/2019 | Reisswig | G06N 3/04 |
| 2020/0004815 A1* | 1/2020 | Weisberg | G06N 5/046 |
| 2020/0089946 A1* | 3/2020 | Mallick | G06V 30/416 |
| 2020/0143349 A1* | 5/2020 | Lau | G06Q 20/102 |
| 2020/0160050 A1* | 5/2020 | Bhotika | G06V 30/414 |
| 2020/0160086 A1* | 5/2020 | Florencio | G06V 30/412 |
| 2020/0176098 A1* | 6/2020 | Lucas | G16H 10/60 |
| 2021/0004584 A1* | 1/2021 | Bildner | G06V 30/19173 |
| 2021/0110527 A1* | 4/2021 | Wheaton | G06T 7/0002 |
| 2021/0125034 A1* | 4/2021 | Nguyen | G06N 3/084 |
| 2021/0133438 A1* | 5/2021 | Florencio | G06F 18/41 |
| 2021/0182659 A1* | 6/2021 | Makhija | G06F 16/9024 |
| 2021/0248367 A1* | 8/2021 | Gal | G06V 10/82 |
| 2022/0051391 A1* | 2/2022 | Bogomolny | G01N 21/952 |
| 2022/0091837 A1* | 3/2022 | Chai | G06F 8/36 |

OTHER PUBLICATIONS

Rusiñol et al. "Field Extraction from Administrative Documents by Incremental Structural Templates", 2013 12th International Conference on Document Analysis and Recognition (Year: 2013).*

Kissos et al. "OCR Error Correction Using Character Correction and Feature-Based Word Classification", 2016 12th IAPR Workshop on Document Analysis Systems (DAS) (Year: 2016).*

* cited by examiner

| Layer (type) | Output Shape | Param # |
|---|---|---|
| dense_340 (Dense) | (None, 32) | 320 |
| dense_341 (Dense) | (None, 512) | 16896 |
| dense_342 (Dense) | (None, 512) | 262656 |
| dense_343 (Dense) | (None, 512) | 262656 |
| dense_344 (Dense) | (None, 512) | 262656 |
| dense_345 (Dense) | (None, 512) | 262656 |
| dense_346 (Dense) | (None, 512) | 262656 |
| dense_347 (Dense) | (None, 512) | 262656 |
| dense_348 (Dense) | (None, 512) | 262656 |
| dense_349 (Dense) | (None, 512) | 3591 |

Total params: 1, 859, 399
Trainable params: 1, 859, 399
Non-trainable params: 0

FIG. 3B

SYSTEM AND METHOD FOR DETERMINATION OF LABEL VALUES IN UNSTRUCTURED DOCUMENTS

PRIORITY CLAIM

This U.S. patent application claims priority under 35 U.S.C. § 119 to: India Application No. 201921047655, filed on Nov. 21, 2019. The entire contents of the aforementioned application are incorporated herein by reference.

TECHNICAL FIELD

This disclosure relates generally to processing of unstructured documents, and, more particularly, to system and method for processing the unstructured documents to automatically locate label values for the labels therein.

BACKGROUND

Extracting information from variable format documents such as invoices and receipts has been a challenging task. Typically, such documents may be obtained from different parties, and thus may possess distinct formats. Usually information in the form of label-label value pair is to be extracted from such documents. Examples of such labels may include, but are not limited to Invoice number, Invoice date, Address, and so on.

A typical challenge with extraction of label-label value pairs in such documents is that these labels and their values may be present at dynamic places for documents received from different parties, thereby making it difficult to train an extraction system which uses fixed location based extraction techniques. Fixed location based extraction technique also needs an ability to train locations of every label and value information for every variation of third party that is sending the documents.

SUMMARY

Embodiments of the present disclosure present technological improvements as solutions to one or more of the above-mentioned technical problems recognized by the inventors in conventional systems. For example, in one embodiment, a method for determining label values in unstructured documents is provided. The method includes defining, via one or more hardware processors, an extraction profile comprising a set of labels for which values are to be extracted from the unstructured document. Further the method includes identifying, via the one or more hardware processors, a plurality of sections in one or more page images of an unstructured document, each section of the plurality of sections identified based on one or more image processing techniques. Furthermore the method includes generating, via the one or more hardware processors, a plurality of bounding boxes in the one or more page images, each of the one or more bounding boxes enclosing a section of the plurality of sections. Also the method includes obtaining, via the one or more hardware processors, a label value for each label from amongst the plurality of labels stored in the extraction profile. Obtaining the label value for each label includes extracting the plurality of labels. In an embodiment, extracting a label comprises performing for each bounding box of the plurality of bounding boxes includes extracting text comprised in the bounding box, features of the bounding box and an OCR confidence score ($C_{OCR}$) associated with the text based on a confidence score associated with each word of the text using an OCR technique, determining whether a label text for a label from amongst the plurality of labels is present in the bounding box, the label text for the label comprising one of a label name and one or more synonyms for the label name, on determination of absence of the label in the bounding box, applying OCR error correction model and a partial matching model, wherein the OCR error correction model utilizes minimum distance technique to identify inaccuracy in the text identified through the OCR technique, and the partial matching model computes a level of matching between the text identified using the OCR error correction model and the label from amongst the plurality of labels; and extracting the label from the bounding box on determination of the level of matching between the text identified using the OCR error correction model and the label from amongst the plurality of labels being more than or equal to a predefined threshold. A bounding box having label value corresponding to the label is identified from amongst the plurality of bounding boxes. The bounding box may be one of the bounding box having the label text and a value matching data type criteria for the label in the bounding box and a neighboring bounding box containing value matching data type criteria in vicinity of the bounding box comprising the label text using a nearest proximity neighbor criteria. The method further includes predicting, via the one or more hardware processors, a bounding box comprising the label value associated with the label text using a deep learning model, the deep learning model trained with location information and data type criteria associated with the label values of the labels. An aggregate confidence score for the text in the bounding box is obtained via the one or more hardware processors. The aggregate confidence score is indicative of the text being a label value for the label in the bounding box, the aggregate confidence score obtained as a weighted sum of a confidence score ($C_{POS}$) of identification of position of the bounding box comprising label value in comparison with the position of label value obtained from deep learning model, a confidence score ($C_{PROXIMITY}$) of the extracted value of the label in a neighboring bounding box, a confidence score ($C_{SIZE}$) associated with size of the bounding box, and the $C_{OCR}$ associated with the OCR.

In another aspect, a system for determining label values in unstructured documents is provided. The system includes one or more memories; and one or more first hardware processors, the one or more first memories coupled to the one or more first hardware processors, wherein the one or more first hardware processors are configured to execute programmed instructions stored in the one or more first memories, to define an extraction profile comprising a set of labels for which values are to be extracted from the unstructured document. Further the one or more hardware processors are configured by the instructions to identify a plurality of sections in one or more page images of an unstructured document, each section of the plurality of sections identified based on one or more image processing techniques. Furthermore, the one or more hardware processors are configured by the instructions to generate a plurality of bounding boxes in the one or more page images, each of the one or more bounding boxes enclosing a section of the plurality of sections. Also, the one or more hardware processors are configured by the instructions to obtain a label value for each label from amongst the plurality of labels stored in the extraction profile. Obtaining the label value for each label includes extracting the plurality of labels. In an embodiment, extracting a label comprises performing for each bounding box of the plurality of bounding boxes includes extracting text comprised in the bounding box, features of the bounding box and an OCR confidence score ($C_{OCR}$) associated with the text based on a confidence score associated with each word of the text using an OCR technique, determining whether a label text for a label from amongst the plurality of labels is present in the bounding box, the label text for the label comprising one of a label name and one or more synonyms for the label name, on determination of absence of the label in the bounding box, applying OCR error correction model and a partial matching model, wherein the OCR error correction model utilizes minimum distance technique to identify inaccuracy in the text identified through the OCR technique, and the partial matching model computes a level of matching between the text identified using the OCR error correction model and the label from amongst the plurality of labels; and extracting the label from the bounding box on determination of the level of matching between the text identified using the OCR error correction model and the label from amongst the plurality of labels being more than or equal to a predefined threshold. A bounding box having label value corresponding to the label is identified from amongst the plurality of bounding boxes. The bounding box may be one of the bounding box having the label text and a value matching data type criteria for the label in the bounding box and a neighboring bounding box containing value matching data type criteria in vicinity of the bounding box comprising the label text using a nearest proximity neighbor criteria. The method further includes predicting, via the one or more hardware processors, a bounding box comprising the label value associated with the label text using a deep learning model, the deep learning model trained with location information and data type criteria associated with the label values of the labels. An aggregate confidence score for the text in the bounding box is obtained. The aggregate confidence score is indicative of the text being a label value for the label in the bounding box, the aggregate confidence score obtained as a weighted sum of a confidence score ($C_{POS}$) of identification of position of the bounding box comprising label value in comparison with the position of label value obtained from deep learning model, a confidence score ($C_{PROXIMITY}$) of the extracted value of the label in a neighboring bounding box, a confidence score ($C_{SIZE}$) associated with size of the bounding box, and the $C_{OCR}$ associated with the OCR.

In yet another aspect, a non-transitory computer readable medium for a method for label value determination in an unstructured document is provided. The method includes determining label values in unstructured documents is provided. The method includes defining, via one or more hardware processors, an extraction profile comprising a set of labels for which values are to be extracted from the unstructured document. Further the method includes identifying, via the one or more hardware processors, a plurality of sections in one or more page images of an unstructured document, each section of the plurality of sections identified based on one or more image processing techniques. Furthermore the method includes generating, via the one or more hardware processors, a plurality of bounding boxes in the one or more page images, each of the one or more bounding boxes enclosing a section of the plurality of sections. Also the method includes obtaining, via the one or more hardware processors, a label value for each label from amongst the plurality of labels stored in the extraction profile. Obtaining the label value for each label includes extracting the plurality of labels. In an embodiment, extracting a label comprises performing for each bounding box of the plurality of bounding boxes includes extracting text comprised in the bounding box, features of the bounding box and an OCR confidence score (COCR) associated with the text based on a confidence score associated with each word of the text using an OCR technique, determining whether a label text for a label from amongst the plurality of labels is present in the bounding box, the label text for the label comprising one of a label name and one or more synonyms for the label name, on determination of absence of the label in the bounding box, applying OCR error correction model and a partial matching model, wherein the OCR error correction model utilizes minimum distance technique to identify inaccuracy in the text identified through the OCR technique, and the partial matching model computes a level of matching between the text identified using the OCR error correction model and the label from amongst the plurality of labels; and extracting the label from the bounding box on determination of the level of matching between the text identified using the OCR error correction model and the label from amongst the plurality of labels being more than or equal to a predefined threshold. A bounding box having label value corresponding to the label is identified from amongst the plurality of bounding boxes. The bounding box may be one of the bounding box having the label text and a value matching data type criteria for the label in the bounding box and a neighboring bounding box containing value matching data type criteria in vicinity of the bounding box comprising the label text using a nearest proximity neighbor criteria. The method further includes predicting, via the one or more hardware processors, a bounding box comprising the label value associated with the label text using a deep learning model, the deep learning model trained with location information and data type criteria associated with the label values of the labels. An aggregate confidence score for the text in the bounding box is obtained via the one or more hardware processors. The aggregate confidence score is indicative of the text being a label value for the label in the bounding box, the aggregate confidence score obtained as a weighted sum of a confidence score ($C_{POS}$) of identification of position of the bounding box comprising label value in comparison with the position of label value obtained from deep learning model, a confidence score ($C_{PROXIMITY}$) of the extracted value of the label in a neighboring bounding box, a confidence score ($C_{SIZE}$) associated with size of the bounding box, and the $C_{OCR}$ associated with the OCR.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3B illustrates an example deep learning network utilized for label value determination in unstructured documents of distinct format, in accordance with an example embodiment of present disclosure.

DETAILED DESCRIPTION

Figure 1:
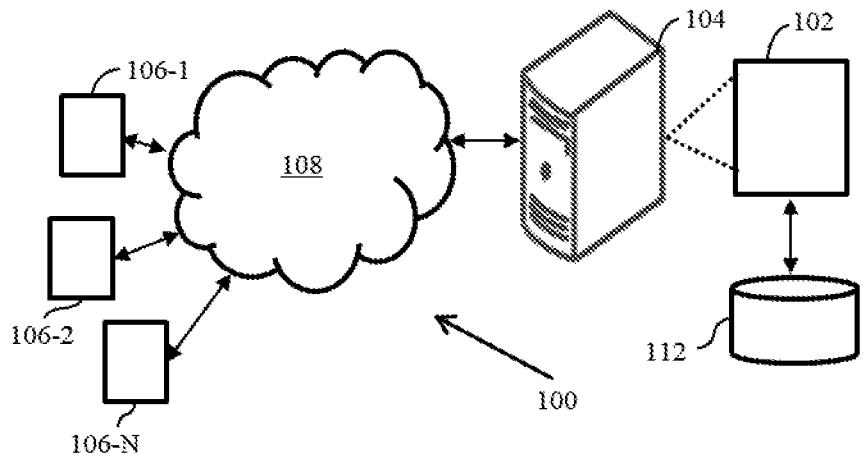
FIG. 1 illustrates an exemplary network environment for implementation of a system for label value determination in unstructured documents of distinct format according to some embodiments of the present disclosure.

Automated systems are configured to extract information from variable format documents such as invoices and receipts using computer automation methods. However, typical computer automation methods are limited in capacity thereof to extract label-label value pair accurately since documents received from distinct sources may have distinct formats.

Certain conventional systems are configured to understand layout of document, but such systems are limited in capability thereof to extract values without associated labels. Moreover, when the labels are in form of images such as logos, it is even more challenging to extract label values.

Various embodiments describe methods and systems for extracting information such as label-label values pairs from documents associated with distinct format and layout of placement of label and label values in the document. For example, the documents received from different sources and/or third parties may have a varied placement of labels-label values. In an embodiment, the disclosed system is capable of partitioning the documents of distinct formats into different elements and/or sections, and further utilizes a geometrical association technique and OCR technique to associate and extract relevant information regarding the label-label value pair from said documents (irrespective of the format of the document). In an embodiment, the disclosed system provides a unique way of computing confidence score of said extraction. The confidence score is obtained by taking multiple elements into consideration which are specific to the label value extraction from variable format documents. Said confidence score is instrumental in determining accuracy of extraction and decide whether any further effort is needed for correction in assignment of label-label value pairs.

In an embodiment, the disclosed system includes a deep learning model (for example a first deep learning model) that is pre-trained with data including complete layout of the documents. The layout of the documents may include, for example, coordinates of sections which contain labels and values, associations, angles, locations, source or third party, size of every element, centroid locations, and so on. Once the deep learning model is trained, said trained deep learning model may itself be able to predict likely location of label and label value in the documents. The present embodiment facilitates in extracting the label-label value pairs from the unstructured document in case label values exist without any label information in said document.

A deep learning model (for instance a second deep learning model) may also be trained with logo images and values for Party name/department name which exist in the form of logos and/or images. In an embodiment, when the second deep learning model is trained and is used in conjunction with the first deep learning model, the first and the second deep learning model collectively may incorporate an ability to automatically understand the layout of the unstructured document and the system may utilize model predictions for extraction saving processing time.

The details of components of the disclosed system and function thereof along with the method is described further in detailed description below in conjunction with FIGS. 1-5.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

Referring now to the drawings, and more particularly to FIG. 1 through 5, where similar reference characters denote corresponding features consistently throughout the figures, there are shown preferred embodiments and these embodiments are described in the context of the following exemplary system and/or method.

FIG. 1 illustrates an example network implementation 100 of a system 102 for label value determination in unstructured documents of distinct format in accordance with an example embodiment. Herein, the term 'unstructured document' refers to those documents that may be obtained from distinct sources and hence may have distinct formats. For instance, documents such as invoices, bills and so on may be obtained from distinct sources and hence may have different formats. Due to different formats thereof, said documents may have placement of labels at different locations. Also herein the distinct format of the unstructured document refers to placement of various labels and corresponding label values at specific locations with respect to said document, in case the distinct documents belongs to distinct third parties. For instance, an invoice received from a vendor A may have a format which may be distinct from an invoice received from a vendor B.

In an embodiment, the disclosed system is capable of determining labels and corresponding label values in the unstructured documents such as invoices, bills, and so on irrespective of the format of said document. The system determines spatial attributes (such as proximity of label with the label value in the document) and positioning of label-label value pairs in said documents, and computes an aggregate confidence score associated with said determination. As the aggregate confidence score is computed by considering at least spatial layout of label-label value pair and corresponding associated neighbor fields/text, the computed aggregate confidence score reflects true evaluation of confidence score conditions.

Although the present disclosure is explained considering that the system 102 is implemented on a server, it may be understood that the system 102 may also be implemented in a variety of computing systems 104, such as a laptop computer, a desktop computer, a notebook, a workstation, a cloud-based computing environment and the like. It will be understood that the system 102 may be accessed through one or more devices 106-1, 106-2 . . . 106-N, collectively referred to as devices 106 hereinafter, or applications residing on the devices 106. Examples of the devices 106 may include, but are not limited to, a portable computer, a personal digital assistant, a handheld device, a Smartphone, a tablet computer, a workstation and the like. The devices 106 are communicatively coupled to the system 102 through a network 108.

In an embodiment, the network 108 may be a wireless or a wired network, or a combination thereof. In an example, the network 108 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 108 may include a variety of network devices, including routers, bridges, servers, computing devices, storage devices. The network devices within the network 108 may interact with the system 102 through communication links.

As discussed above, the system 102 may be implemented in a computing device 104, such as a hand-held device, a laptop or other portable computer, a tablet computer, a mobile phone, a PDA, a smartphone, and a desktop computer. The system 102 may also be implemented in a workstation, a mainframe computer, a server, and a network server. In an embodiment, the system 102 may be coupled to a data repository, for example, a repository 112. The repository 112 may store data processed, received, and generated by the system 102. In an alternate embodiment, the system 102 may include the data repository 112.

The network environment 100 supports various connectivity options such as BLUETOOTH®, USB, ZigBee and other cellular services. The network environment enables connection of devices 106 such as Smartphone with the server 104, and accordingly with the database 112 using any communication link including Internet, WAN, MAN, and so on. In an exemplary embodiment, the system 102 is implemented to operate as a stand-alone device. In another embodiment, the system 102 may be implemented to work as a loosely coupled device to a smart computing environment. The components and functionalities of the system 102 are described further in detail with reference to FIGS. 2-5.

Figure 2A:
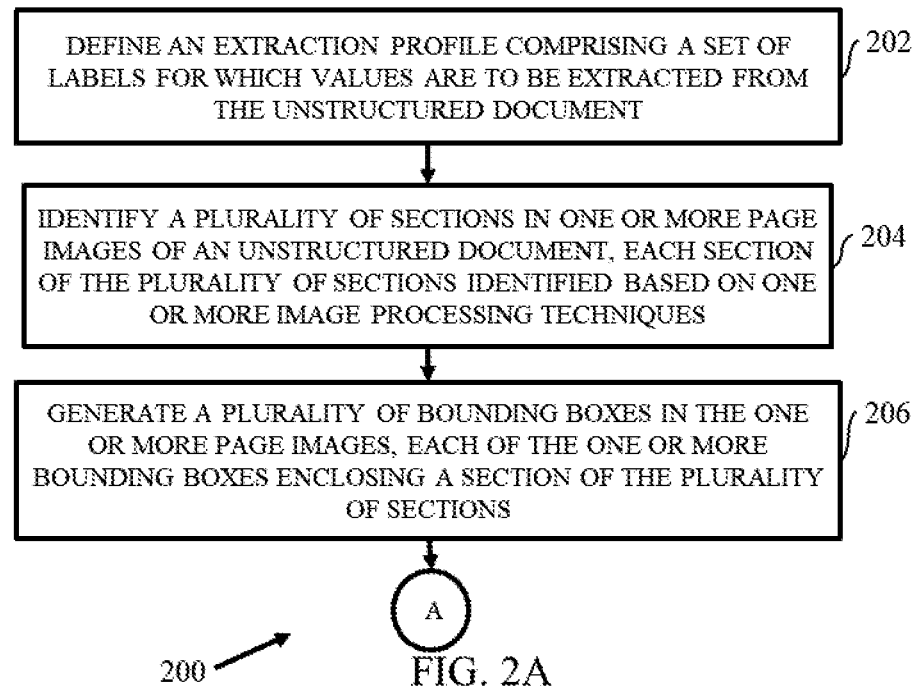
FIGS. 2A-2B illustrates an example flow diagram of a method for label value determination in unstructured documents, in accordance with an example embodiment of present disclosure.
Figure 2B:
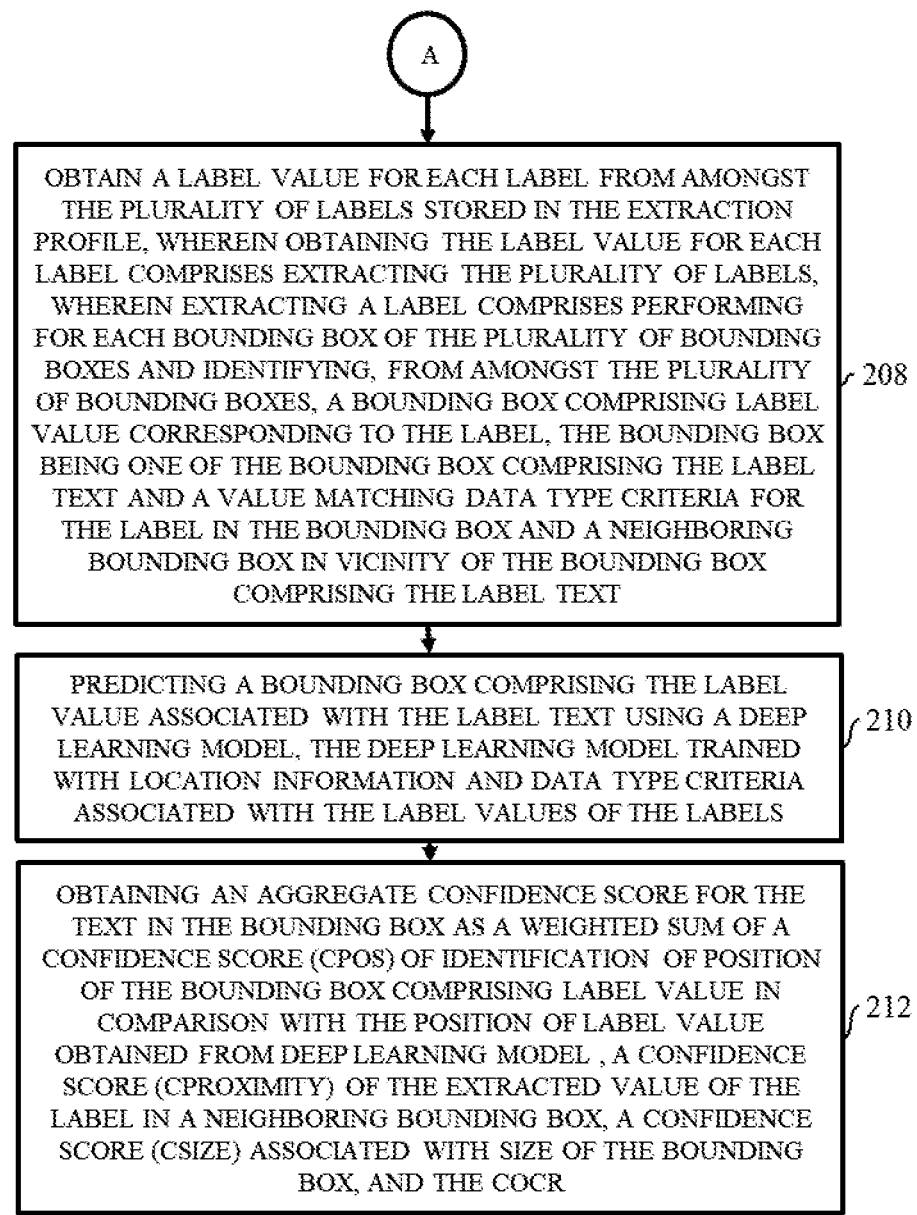
Figure 3A:
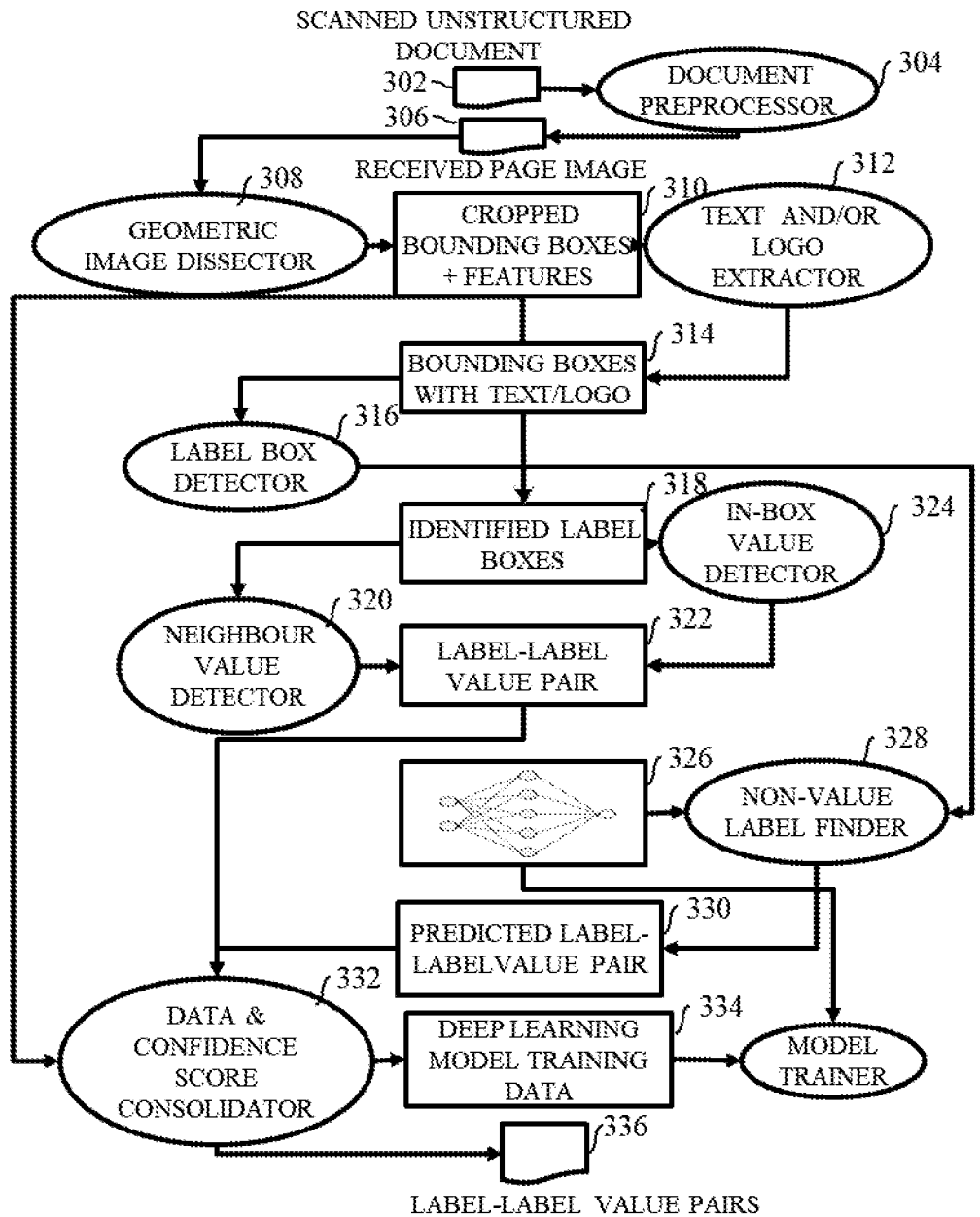
FIG. 3A illustrates a process flow diagram for label value determination in unstructured documents of distinct format, in accordance with an example embodiment of present disclosure.
Figure 4:
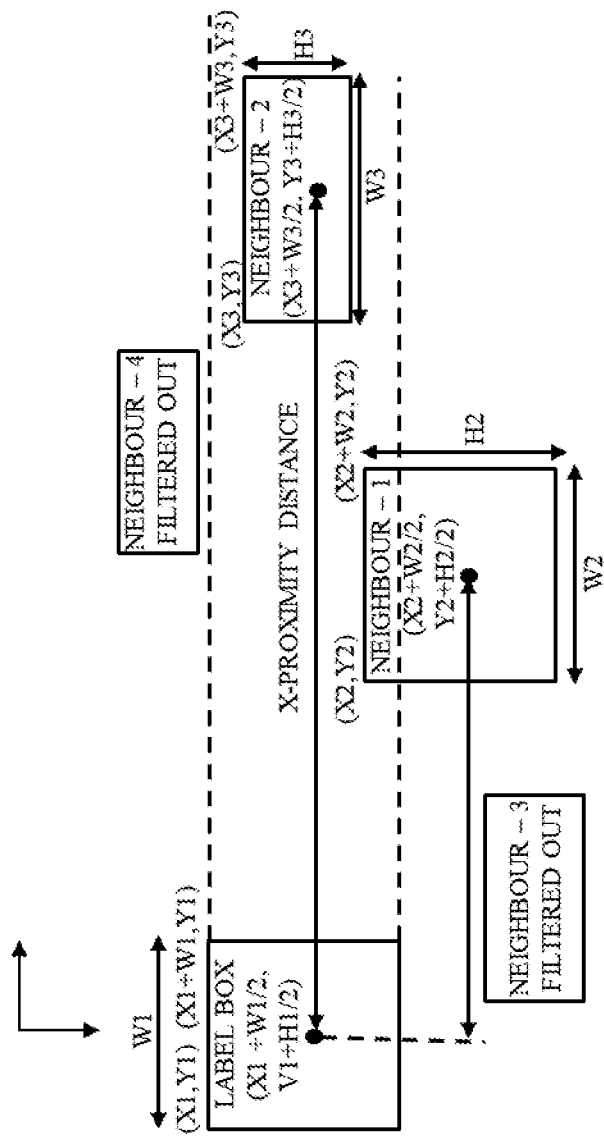
FIG. 4 illustrates an example flow diagram of a method for detection of label text in neighboring bounding boxes, in accordance with an example embodiment of present disclosure.
Figure 5:
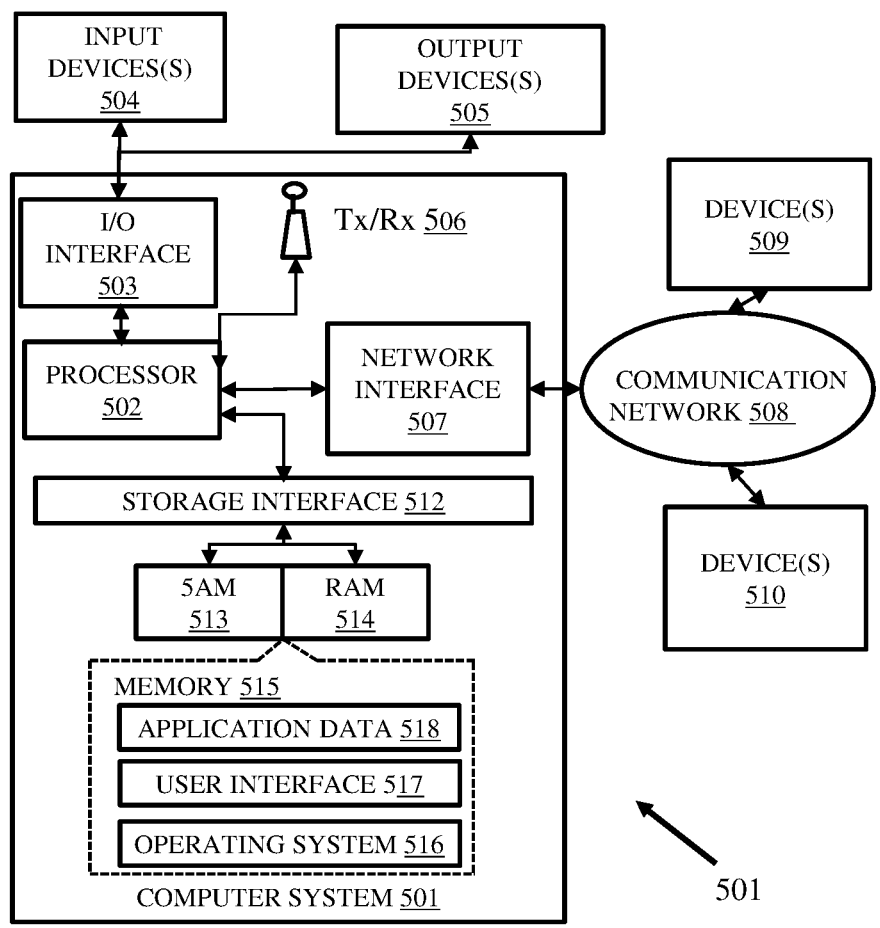
FIG. 5 illustrates a block diagram of an exemplary computer system for implementing embodiments consistent with the present disclosure.

Referring collectively to FIGS. 2A-5, components and functionalities of the system 102 for label value determination in unstructured documents of distinct format are described in accordance with an example embodiment. For example, FIGS. 2A-2B illustrates a flow diagram for a method for label value determination in unstructured documents of distinct format, in accordance with an example embodiment of the present disclosure. FIG. 3A illustrates a process flow diagram for label value determination in unstructured documents of distinct format, as described in accordance with an example embodiment. FIG. 3B illustrates an example deep learning network utilized for label value determination in unstructured documents of distinct format. FIG. 4 illustrates an example flow diagram of a method for detection of label text in neighboring bounding boxes, in accordance with an example embodiment of present disclosure. FIG. 5 illustrates a block diagram of an exemplary computer system for implementing embodiments consistent with the present disclosure.

As illustrated, FIGS. 2A-2B and FIG. 3 are an example process flow for extracting metadata from documents to determine label-label value therein in accordance with an example embodiment. In an embodiment, at 202 (FIG. 2A) an extraction profile is defined for type of the unstructured document (for example, document 302, FIG. 3A) to be processed for label-label value pairs extraction. In an embodiment, the extraction profile may include metadata fields to be extracted from the documents, including but not limited to, label text (including label name and synonyms for label names), valid data type for value of the labels, permitted pattern to be used for matching of the label value, order of directions to be used for neighboring bounding box selection. For example, an extraction profile for an invoice may include Invoice Number (synonyms of Invoice number), Invoice Date, Ship-to-State, Supplier Name and so on. In addition, the extraction profile may include coefficient weights that may be utilized for calculating aggregate confidence score using the plurality of confidence scores, as will be described further in the description below. In an embodiment, the extraction profile for the unstructured documents may be saved for processing of said documents.

In an embodiment, the unstructured documents may initially be preprocessed to identify sections in the page images thereof at 204 (FIG. 2A). Herein, the unstructured documents may include scanned documents of distinct formats. The formats of the unstructured documents may be distinct owing to the fact that the documents may include invoices, bills and so on received from distinct third parties, billers and so on, each following a distinct format. In an embodiment, preprocessing of the documents may be performed by a document preprocessor 304 (FIG. 3A) using various image processing techniques to convert pages of the document into page images (for example, page image 306, FIG. 3A) and identify sections therein. In an embodiment, the image processing techniques facilitate in detection of whitespace around those sections that may have thickness more than a defined threshold value, and bounding boxes may be generated around such sections, as will be defined further in the description below. In an alternate embodiment, the bounding boxes may be generated by utilizing an HOCR technique that formats OCR output of a page and provides location of every word which is treated as a section. HOCR may be utilized for labels which have single word values such as invoice number, invoice date, and so on. In an embodiment, the bounding boxes may be generated by geometric image dissector 308 (FIG. 3A).

In an embodiment, for detection of whitespaces around sections, firstly a document layout may be determined for each page image of the document. In an embodiment, determining the layout of the document may refer to dissecting the page image into sections and identifying geometric and/or spatial layout of elements of the page image. In an embodiment, the layout of the page images may be obtained by initially converting the page image to grey scale so that entire contents/elements of the page image are neutralized to black and white. In an embodiment, various computer vision tools such as Open CV™ may be utilized for conducting this image processing step of converting the page image to gray scale.

An adaptive image thresholding may be applied on the grey scale image to make image contents, such as written text white and the background black. In an embodiment, various computer vision tools such as Open CV™ may be utilized for applying the adaptive image thresholding. The page image may then be dilated to increase the thickness of content which is in white colour so that nearby contents merge with each other and form a single white colour element. Dilation may be done repetitively so that optimal intended areas may be grouped together. Computer vision products such as Open CV are used for conducting the image processing step. Bounding boxes are drawn or generated around edge of the white colored elements at 206 (FIG. 2A). The bounding boxes may then be overlaid on original image to finally give rectangular boxes which identify sections of the document. For every element (bounding box) key features as well as features (at 310, FIG. 3A) depicting location with respect to geometry of the bounding box may be saved. These features may include, but are not limited to, i) Unique Identification number given by system; ii) part image section contained in the bounding box; iii) Location—x, y location of the left, top point of the bounding box; iv) Size—height, width; v) Centroid location—x, y location of centroid of the bounding box vi) Centroid angle in degrees with reference to left, top location of the image.

In an embodiment, it may be determined whether tables are present in the page image. In an embodiment, the table may be detected by identifying all horizontal and vertical lines in the page images using a line detection algorithm. Unwanted small lines as well as characters containing lines such as I and T may be excluded by setting minimum length of the line. Then vertical line excluding the unwanted small lines may qualify for vertical lines. Points of intersection of horizontal and vertical lines are combined together to obtain table grid lines. After detecting one or more tables, bounding boxes inside every cell of the table may be obtained. In an embodiment, if the table cell further includes another table, the process of identifying cells of the table may be repeated further and bounding boxes for all the cells contained inside the inner cells of the table are also detected.

After detecting the labels, a label value for each label from amongst the plurality of labels stored in the extraction profile is extracted. In order to obtain the label value for each label, the bounding boxes may be assessed to determine whether the label text (label name and/or label values) is present in the bounding boxes. In an embodiment the bounding box may include either a text or a logo or a combination of a text and a logo. In an embodiment, if the bounding box includes a logo, the logo may be extracted by using a deep learning model pre-trained to extract logo from the unstructured document. In an embodiment, a text and/or logo extractor 312 (FIG. 3A) may provide bounding boxes with text and/or logo at 314 (FIG. 3A) to a label box detector 316.

As is understood, the unstructured documents may be obtained from different sources, such as invoices from different vendor types having their specific logo pattern. Logo in the unstructured document may belong to different categories, including, but not limited to logo with text only, logo with image pattern and text and Logo with image pattern only.

Logo identification in the document may be performed by logo detection followed by logo classification. In logo detection, logo region is detected from the unstructured documents, cropped and saved for further processing of logo classification. In an embodiment, known models such as YOLO (You only look once) object detection model may be utilized to detect logo, where a CNN deep neural network model may be trained to detect logo as an object from invoice image. Since, this training of the deep learning model requires huge amount of annotated training data, hence pre-trained weights of logo detection CNN model may also be used to detect logo as an object from image.

In logo classification, for the logo with text only, directly optical character recognition (OCR) of logo region may be performed, to obtain text therefrom, and then text may be interpreted, to identify the source (e.g vendor/company name) to which said unstructured document belongs to. OCR accuracy might also have introduced, because of different style and font of each character in logo text. In an embodiment an OCR correction model and partial string matching model (using minimum edit distance) to detect appropriate logo text.

Logo classification for logos with image pattern and text, and logo with image pattern only, collection of reference logo images is created and features are extracted therefrom. For example extraction models such as SIFT (Scale-Invariant Feature Transform) or SURF (Speeded-Up Robust Features) may be used to extract such features. Said features of logo may be normalized and stored in disk in pickle data format corresponding to logo/vendor name. When a logo image is to be classified, a cosine vector similarity may be calculated between reference logo feature vector and new logo feature vector, taking one reference logo image at a time. Cosine value between the two vectors measures the similarity between reference logo image and new logo image (which is to be classified). By taking a maximum of these calculated cosine similarity value, the logo may be classified into to a particular category.

In an embodiment, the bounding box may include only text. For each of such bounding boxes, a text included in the bounding box, features of the bounding box and an OCR confidence score ($C_{OCR}$) associated with the text are extracted. In an embodiment, the OCR confidence score ($C_{OCR}$) is determined based on a confidence score associated with each word of the text using an OCR technique.

In an embodiment, the confidence score ($C_{OCR}$), i.e. the confidence score of label value which contains more than one word is calculated using below formula:

$$C_{OCR} = \frac{\sum_{i=0}^{n} CW_{OCR}^{(i)}}{n}$$

$C_{OCR}$=Confidence score obtained from the OCR technique for the label value of given label. The value of $C_{OCR}$ may be between 0 and 1.

$0 <= C_{OCR} <= 1$ $CW_{OCR}^{(i)}$=Confidence score of i-th word contained within the value given by OCR tool
n=total number of words in the value Further, it is determined whether a label text for a label from amongst the plurality of labels is present in said bounding box (at 208, FIG. 2B) or (at 318, FIG. 3A). Herein, the label text for the label may include one of a label name and one or more synonyms for the label name. For instance, for a label 'Payment', the label text may include 'Total Amount Due', 'Payment in dollars', and so on. On determination of absence of the label text in the bounding box, an OCR error correction model and a partial matching model may be applied to the extracted text. The OCR error correction model utilizes minimum distance technique to identify inaccuracy in the text identified through the OCR technique.

In certain scenarios, due to poor image quality, text extraction may extract some text inaccurately. Examples of inaccuracies may include, but are not limited to, deleted character, character replaced by some other character, and so on. For instance, the label term 'Invoice' may be extracted as '1nvoice' (I character replaced by number 1) during OCR, and in such instances, the OCR error correction model may be applied to identify the inaccuracy in text identification (for example, inaccurate conversion of to in the text). The OCR error correction model computes minimum number of operations (or minimum edit distance) which may be utilized to convert the inaccurate string to predefined label string. The OCR error correction model may deal with the inaccuracies including but not limited to, one or more new characters introduced, one or more characters deleted, one or more character is replaced by some other character. The OCR error correction model identifies one or more combinations of said possibilities and then calculates total number of operations required to match the string to the pre-defined label. After calculating edit-distance (number of operations), threshold value to measure the degree of matching two strings can be defined. In an embodiment, the match ratio may be computed as:

Match percentage=(1−(edit distance/length of original string))*100

For example, predefined label string="INVOICE NUMBER"

String obtained after performing OCR="ilNvoicE Numeer"

Minimum edit distance calculated by algorithm: 2

Match percentage: 85.71

In an embodiment, at 322 (FIG. 3A) the label is extracted from the bounding box on determination of the level of matching between the text (identified using the OCR error correction model) and the label (from amongst the plurality of labels) is more than or equal to a predefined threshold at 208 (FIG. 2B). In an embodiment, an in-box value detector 324 (FIG. 3A) may extract the label from the bounding box.

After detecting the labels, it is determined whether or not the label value is present in the same bounding box in which the label is detected. In an embodiment, the In-box value detector 324 may determine whether the label value for the label is contained in the same bounding box. If the label value is determined to be present in the same bounding box in which the label is detected, the detected label value is extracted from the bounding box and a label-label value pair are returned as output at 322.

In order to extract the label values from the bounding boxes, a bounding box having label value corresponding to the label is identified from amongst the plurality of bounding boxes. The bounding box having the label may be the same bounding box having the label text or a bounding box neighboring the bounding box having the label. Hereinafter, a bounding box neighboring to the bounding box having the label may be referred to as 'neighboring bounding box'. The presence or absence of labels in the bounding boxes or neighboring bounding boxes may be detected based at least on a matching criteria pertaining to matching of the text of the label and the label value. In an embodiment, the matching between the label text and the label value may be performed based on a data type of the label text and the label value. For instance, if the label text is determined to be 'Date', then the data type of the label value may be in a format 'DD-MM-YYYY', or numeric format or structured combination of numerals, characters and special characters (such as '-' or '/').

In an embodiment, the label value may not be detected in the same bounding box as that of the label. In such a scenario, the neighboring bounding boxes may be examined to determine the label values therein. In an embodiment, a neighbor value detector 320 (FIG. 3A) may be configured to detect likely neighboring bounding box which may contain the value for the given label. Herein, it should be understood that only relevant or likely neighboring bounding boxes may be considered for detecting presence of label value therein. In an embodiment, the likely or relevant neighboring boxes may be those neighboring bounding boxes that may be in a defined vicinity of the bounding box containing the bounding box. A flow-diagram illustrating a method to determine the relevant neighboring bounding boxes is described further with reference to FIG. 4.

In an embodiment, text present in neighboring box is detected for a match based on type of value that needs to be associated for label. For example, for label invoice-date, text value present in the neighboring bounding box text should be of date format, e.g. '12.02.2019' or '12 Feb. 2019', and so on. By matching the pattern of data type using pattern matching, label values may be matched with the labels and thereafter extracted. If the right match is found, it is determined as label-label value pair and next label bounding box may be considered for processing. If after considering all neighboring bounding boxes, matching value is not found, then no value may be reported against the label.

In an embodiment, a trained deep learning model (for example, the first deep learning model or deep learning model 326 in FIG. 3A) may be utilized to obtain prediction for label value corresponding to the label at 210 (FIG. 2B). In an embodiment, a non-value label finder 328 (FIG. 3A) may receive input from the model 326 (FIG. 3B) to predict the label value. The predicted label value 330 may then be compared with the label value obtained based on the matching in the likely neighboring boxes. Based on the comparison of the predicted label value with the determined label value, a confidence score ($C_{POS}$) may be given to the determined label value. In an embodiment, based on comparison, if the predicted label value is determined to be in the neighboring bounding boxes, a high confidence score may be assigned to the extracted label value. In an embodiment, the confidence score for value of a label using position of bounding box containing value with respect to training model is calculated based on below formula:

$$C_{POS} = \frac{e^{-\left(\frac{|y_{mcat}-y|}{max(y_{mcat},y)}\right)} + e^{-\left(\frac{|x_{mcat}-x|}{max(x_{mcat},x)}\right)}}{2}$$

$C_{POS}$=Confidence score for value of label based on position of bounding box containing the value. This value will be between 0 and 1.

$0<=C_{POS}<=1$ $y_{mcat}$=y coordinates for centroids of bounding boxes containing value for the given label are all stored in a deep learning model for a training data comprising processed documents for given category (e.g. Supplier for invoice). Mean of these stored y coordinate value is taken and used.

y=y position of the centroid of the bounding box that is taken from the document given for processing $x_{mcat}$=x coordinates for centroids of bounding boxes containing value for the given label are all stored in a model for all past processed documents for given category (e.g. Supplier for invoice). Mean of these stored x coordinate value is taken and used.

x=x position of the centroid of the bounding box that is taken from the document given for processing As is seen above, there may be instances where label values are present without any presence of the label in the page image. In such cases, it may challenging to obtain the label value contained in the same bounding box as label or the label value is derived based on a detection of the neighboring bounding box. To obtain value of such metadata, Deep Learning Model for non-label value prediction may be used which uses deep learning neural network model to predict metadata value. In an embodiment, extraction of the label values for labels using the deep learning model may be performed based on below mentioned steps.

At step 1, information pertaining to all the bounding boxes present in the page image is obtained, and following steps (step 2-step 4) are repeated for every bounding box. At step 2, using the deep learning trained model, a prediction confidence score of likelihood of presence of metadata field in the bounding box is determined. At step 3, after going through all bounding boxes and obtaining confidence score for all bounding boxes, a bounding box with maximum confidence score is determined. At step 4, the text content of the bounding box from step 3 is obtained and value for given metadata field is determined. If the value does not match type of information needed for the metadata field (e.g. date, numeric etc.), no value for the metadata field is reported. If, however, the value satisfies the type criteria, said value is reported as label-value pair. The aforementioned process of steps 1-4 is repeated for the next metadata field which may be without label and for which no value is determined yet. In an embodiment, in case the match is found, confidence score received from OCR tool may further determine the confidence score of OCR based on words which are part of value using words average technique. In an embodiment, the confidence score for value of a label using neighbor proximity distance of centroid position of bounding box containing value field and centroid position of the bounding box containing corresponding label is calculated using below formula:

$$C_{PROXIMITY} = \begin{cases} e^{-\left(\frac{x_{proximitydistance}}{width_{page}}\right)}, & associationtype\ in\lfloor right, left\rfloor \\ e^{-\left(\frac{y_{proximitydistance}}{height_{page}}\right)}, & associationtype\ in\lfloor top, down\rfloor \end{cases}$$

$C_{PROXIMITY}$=Confidence score for value of label based on proximity distance between centroids of bounding boxes containing label and value. This value will be between 0 and 1.

$0<=C_{PROXIMITY}<=1$ $x_{proximitydistance}$=This is distance in x axis direction between x coordinates of centroids of bounding boxes containing label and value.

$y_{proximitydistance}$=This is distance in y axis direction between y coordinates of centroids of bounding boxes containing label and value.

$width_{page}$=This is width of the page $height_{page}$=This is height of the page Further, the deep learning model may determine a confidence score of position identification ($C_{POS}$) using trained deep learning model with positional confidence score algorithm. In an embodiment, the confidence score of value for a label based on position of bounding box containing the value is calculated based on below formula:

$$C_{POS} = \frac{e^{-\left(\frac{|y_{mcat}-y|}{max(y_{mcat},y)}\right)} + e^{-\left(\frac{|x_{mcat}-x|}{max(x_{mcat},x)}\right)}}{2}$$

$C_{POS}$=Confidence score for value of label based on position of bounding box containing the value. This value will be between 0 and 1.

$0<=C_{POS}<=1$ $y_{mcat}$=y coordinates for centroids of bounding boxes containing value for the given label are all stored in a model for all past processed documents for given category (e.g. Supplier for invoice). Mean of these stored y coordinate value is taken and used.

y=y position of the centroid of the bounding box that is taken from the document given for processing $x_{mcat}$=x coordinates for centroids of bounding boxes containing value for the given label are all stored in a model for all past processed documents for given category (e.g. Supplier for invoice). Mean of the stored x coordinate value may be taken and utilized in the above formula.

x=x position of the centroid of the bounding box that is taken from the document given for processing.

Additionally, the deep leaning model may determine the confidence score based on size of bounding box containing the label value using trained model. In an embodiment, the confidence score ($C_{SIZE}$) is determined based on the size of the bounding box containing value of the label in comparison with mean of size of bounding boxes which is trained in the model for similar category of documents is calculated using below formula:

$$C_{SIZE} = \frac{e^{-\left(\frac{|width_m-width|}{max(width_m,width)}\right)} + e^{-\left(\frac{|height_m-height|}{max(height_m,height)}\right)}}{2}$$

$C_{SIZE}$=Confidence score for value of label based on size of bounding box containing value with reference to mean size trained in the model for same category of documents. This value will be between 0 and 1.

$0<=C_{SIZE}<=1$ $width_m$=Mean of the width taken from the trained model for value of the label $height_m$=Mean of the width taken from the trained model for value of the label width=Width of the bounding box containing value of the label in consideration heigth=Height of the bounding box containing value of the label in consideration.

In an embodiment, an aggregate confidence score, that is indicative of the text being a label value for the label in the bounding box, is obtained at 212 (FIG. 2B). In an embodiment the aggregate confidence score is obtained by a data and confidence score calculator 332. In an embodiment, the aggregate confidence score is obtained as a weighted sum of a confidence score ($C_{POS}$) of identification of position of the bounding box containing label value in comparison with the position of label value which is obtained from trained deep learning model for the label value, a confidence score ($C_{PROXIMITY}$) of the extracted value of the label in a neighboring bounding box, a confidence score ($C_{SIZE}$) associated with size of the bounding box, and the COCK.

The aggregate Confidence score for the value of the label maybe calculated based on the confidence scores using below formula:

$$C_{AGG} = \frac{a * C_{OCR} + b * C_{POS} + c * C_{PROXIMITY} + d * C_{SIZE}}{a + b + c + d}$$

(Where $a, b, c, d \geq 0$)

$C_{AGG}$=Final Aggregate Confidence score for value of label. This value will be between 0 and 1.

$0 <= C_{AGG} <= 1$ a, b, c, d=These are coefficient weights assigned to all individual confidence scores based on what weightage needs to be given on which confidence score. Usually OCR and Proximity are given high weightage.

The deep learning model may be trained using the deep learning model training data 334. The deep learning training data 334 includes a multitude of parameters including, for example, parameter (Party Name/Department, and so on) for which layout of the document follows similar pattern. Certain features are stored for every metadata filed, including but not limited to, Cropped image containing the bounding box of label, Cropped image containing the bounding box of the label value (It is same as label in case value is contained in same bounding box as label), Location (x, y location of the left, top point of the bounding box containing), value of metadata, and size (height, width of bounding box containing label value), size (height, width of bounding box containing label), Centroid location—x, y location of centroid of the bounding box containing value, Centroid angle in degrees with reference to left, top location of the image containing value, Length of text contained in the bounding box in terms of number of characters, Type of text contained—numeric, alphanumeric, date string format, address string format, Angle in degrees of line joining left, top point of the document and Centroid point of the bounding box containing label, Angle in degrees of line joining left, top point of the document and Centroid point of the bounding box containing value, text contained in the bounding box containing value such as alphanumeric, Length of text contained in bounding box containing value, Type of data value, date string format, address string format etc. In case of multiple words present in the bounding box and where any other specific format is not applicable, string format is taken for such value, OCR accuracy of all words contained in the bounding box containing label is aggregated, and OCR accuracy of all words contained in the bounding box containing value is aggregated.

In an embodiment, the features may be pre-processed by performing feature selection, feature encoding and feature normalization. In feature selection, certain features (such as Unique Identification number, value text, and so on) may be dropped from training dataset during feature engineering process, before providing said data to the Deep Learning model for training. In feature encoding, all categorical features such as category (Department/Supplier, and so on), type of text and so on may be encoded to numerical value. For instance, in feature type of text, 0 represents numeric, 1 represents alpha-numeric, 2 represents data and so on. In feature normalization, all features are normalized using open source library such as tensor Flow™. Euclidean mean normalization may be utilized for this purpose.

In an embodiment, the training data may be received from a data consolidator module and may be used for training the deep learning model. After data cleaning, feature normalization and training data pre-processing, the deep learning model may be trained. The deep learning model may predict likelihood of presence of a metadata value field for a given bounding box.

To create deep learning neural network (DNN) model, open source software such Keras™ may be used with Tensorflow™ as backbone along with machine learning pre-processing library such as Scipy. In this dense neural network model, dense layers are stacked together. Total number of such layers is 7. First layer has input shape of size (7), where seven is placeholders for all seven columns/features in the training dataset.

In an embodiment, the deep learning model may include densely connected layers with each layer having RELU as an activation function. In an embodiment, the dropout rate may vary from 0.2 to 0.4. A last layer of the deep learning model may have Softmax as an activation function. In an embodiment, the deep learning model may be achieved using a deep learning library. Categorical cross-entropy is used as a loss function of the disclosed deep learning model and 'adagrad' may be utilized as optimizer to converge the loss function value during training. An example structure of the deep learning model is depicted in FIG. 3B.

In an embodiment, the deep learning model may be utilized for prediction. All the training data from training data set for all features may be used to train the deep learning model. Open source libraries such as Scipy sklearn may be used to define and train a Machine Learning model. Algorithms such as SVN or Random Forest are used to define the model architecture. After defining the model, training data is fed to model for training with defined total number of iterations. Checkpoints are created as model backup, after every predetermined number of iterations, which can be used later, if model training fails or crashes in-between. The trained model is used to predict location and size of the bounding boxes for the actual run time documents which are processed. Model also provides metrics such as accuracy, F1 score and recall which are used to calculate confidence score for prediction. The calculated confidence scores may be utilized for determining label values corresponding to labels (or label-label value pairs 336).

Herein, it will be understood that the disclosed embodiments utilizes a first deep learning model and a second deep learning model for the purpose if determining label values in an unstructured document. Herein, in one embodiment, instead of deep learning models any of the know machine learning models may be utilized for determining label values. By way of non-limiting example, the machine learning model may be based on one or more of a supervised learning algorithm, an unsupervised learning algorithm, a semi-supervised learning algorithm, a regression algorithm, an instance-based algorithm, a regularized algorithm, a decision tree algorithm, a Bayesian algorithm, a clustering algorithm, an association rule learning algorithm, an artificial neural network algorithm, a deep learning algorithm, a dimensionality reduction algorithm, or an ensemble algorithm. Applying the machine learning model to the unstructured documents may result in one or more aspects of identification of labels and/or label values in the unstructured documents. By way of non-limiting example, determination of label-label value pairs in said document may include determining whether the label and label values lie in the same bounding box or in neighboring bounding boxes, whether the labels includes text only, text and logo, or only logo and so on.

FIG. 4 illustrates an example flow diagram of a method for detection of label text in neighboring bounding boxes, in accordance with an example embodiment of present disclosure. As previously disclosed, for labels where the label value is not contained in the same bounding box, neighboring bounding box which may be likely to contain the value for a given label may be detected. In particular, a neighboring bounding box having label value matching a data type criteria in vicinity of the bounding box having the label text may be selected. In an embodiment, said neighboring box may be identified from amongst various bounding boxes in the vicinity of the bounding box having the label by using a nearest proximity neighbor criteria. The nearest proximity neighbor criteria enables performing the identification in an ordered manner, for instance in an order of right bounding box, bottom bounding box, left bounding box and top bounding box which can be configured as part of extraction profile.

The process flow for identifying the neighboring bounding box having the label value is described below with reference to steps 402-408 below.

Initially, relevant neighbors right to the Label bounding box may be identified by following these steps. Both horizontal edge lines of the label bounding box parallel to x-axis, are extended. Any overlapping bounding boxes within the boundary of edge lines are considered for further processing. Others bounding boxes are filtered out. For example, FIG. 4, the bounding box Neighbor 3 and Neighbor 4 may be filtered out since they do not overlap on horizontal edge lines of Label box. Both edge lines parallel are extended to y-axis to find relevant neighbors in below direction. A box may be eligible to be considered for further processing, if extended coordinates-axis lines of label box overlap with it. The aforementioned steps may be followed to identify top and left neighbors. The neighboring bounding boxes are processed to find value of the associated label by detecting text content present in the associated neighbor bounding box. The sequence in which neighbor bounding boxes are considered is as below:

Bounding boxes in right direction in order of proximity distance from shortest to farthest,
Bounding boxes in bottom direction in order of proximity distance from shortest to farthest,
Bounding boxes in left direction in order of proximity distance from shortest to farthest,
Bounding boxes in top direction in order of proximity distance from shortest to farthest Based on type of value that needs to be associated for label, text present in neighboring box is detected for a match. For example, for label invoice-date, text value present in the neighboring bounding box text should be of date format, e.g. 12.02.2019 OR 12 Feb. 2019 etc. By matching pattern of data type using pattern matching, values is matched and extracted. If right match is found, it is reported as Label-Value pair and next Label bounding box is considered for processing. If after considering all neighboring bounding boxes, matching value is not found, then no value is reported against Label. Herein, it will be understood that the sequence of bounding boxes define above is for exemplary purpose. In alternate embodiments, the aforementioned sequence may be altered as per the application or the structured document.

Trained AI based model is also used to get prediction for value of the label. If the prediction matches with the processed value using above algorithm steps, then confidence score of value extracted may be increased.

FIG. 5 is a block diagram of an exemplary computer system 501 for implementing embodiments consistent with the present disclosure. The computer system 501 may be implemented in alone or in combination of components of the system 102 (FIG. 1). Variations of computer system 501 may be used for implementing the devices included in this disclosure. Computer system 501 may comprise a central processing unit ("CPU" or "hardware processor") 502. The hardware processor 502 may comprise at least one data processor for executing program components for executing user- or system-generated requests. The processor may include specialized processing units such as integrated system (bus) controllers, memory management control units, floating point units, graphics processing units, digital signal processing units, etc. The processor may include a microprocessor, such as AMD Athlon™, Duron™ or Opteron™, ARM's application, embedded or secure processors, IBM PowerPC™, Intel's Core, Itanium™, Xeon™, Celeron™ or other line of processors, etc. The processor 502 may be implemented using mainframe, distributed processor, multi-core, parallel, grid, or other architectures. Some embodiments may utilize embedded technologies like application specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc.

Output device 505 may be a printer, fax machine, video display (e.g., cathode ray tube (CRT), liquid crystal display (LCD), light-emitting diode (LED), plasma, or the like), audio speaker, etc. In some embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509 and 510. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, any databases utilized in this disclosure.

The memory devices may store a collection of program or database components, including, without limitation, an operating system 516, user interface application 517, user/application data 318 (e.g., any data variables or data records discussed in this disclosure), etc. The operating system 516 may facilitate resource management and operation of the computer system 501. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 501 may store user/application data 318, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, structured text file (e.g., XML), table, or as hand-oriented databases (e.g., using HandStore, Poet, Zope, etc.). Such databases may be consolidated or distributed, sometimes among various computer systems discussed above. It is to be understood that the structure and operation of any computer or database component may be combined, consolidated, or distributed in any working combination.

Additionally, in some embodiments, the server, messaging and instructions transmitted or received may emanate from hardware, including operating system, and program code (i.e., application code) residing in a cloud implementation. Further, it should be noted that one or more of the systems and methods provided herein may be suitable for cloud-based implementation. For example, in some embodiments, some or all of the data used in the disclosed methods may be sourced from or stored on any cloud computing platform.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

Various embodiments of the disclosed herein provides method and system for extracting metadata from documents to determine label-label value. The embodiments of the disclosed method and system solves the technical problem associated with identification of accurately label-label value pairs in unstructured documents. In an embodiment, the system determines bounding boxes in the pages images of the document and extracts the text in bounding boxes. If the extracted text matches with the predefined labels, then the system determines presence of label value in same bounding box or neighbouring bounding boxes. The system is further configured to detect the labels and label values using a deep learning model. Based on a comparison of the label/label values detected via deep learning model and determined based on the bounding box, the system may assign a confidence score to the label-label value pair match. Additionally, the system may assign confidence scores to the text extracted from the bounding box based on the OCR extraction technique, the size of the bounding box, and proximity of bounding boxes containing the label and the label value, and obtains an aggregated confidence score therefrom. The aggregated confidence score is indicative of the accuracy of label-label values extracted by the disclosed method and system.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method for determining label value for labels in unstructured documents, the method comprising:

defining, via one or more hardware processors, an extraction profile comprising a set of labels for which label values are to be extracted from the unstructured document;

identifying, via the one or more hardware processors, a plurality of sections in one or more page images of the unstructured document, each section of the plurality of sections identified based on one or more image processing techniques;

generating, via the one or more hardware processors, a plurality of bounding boxes in the one or more page images, each of the plurality of bounding boxes enclosing a section of the plurality of sections;

obtaining, via the one or more hardware processors, a label value for each label from amongst the plurality of labels stored in the extraction profile, wherein obtaining the label value for each label comprises:

extracting the plurality of labels, via the one or more hardware processors, wherein extracting a label comprises performing for each bounding box of the plurality of bounding boxes;

extracting text comprised in the bounding box, features of the bounding box, and an Optical character recognition (OCR) confidence score (COCR) associated with the text based on a confidence score associated with each word of the text using an OCR technique;

determining whether a label text for a label from amongst the plurality of labels is present in the bounding box, the label text for the label comprising one of a label name and one or more synonyms for the label name;

on determination of absence of the label in the bounding box, applying an OCR error correction model and a partial matching model, wherein the OCR error correction model utilizes a minimum distance technique to identify inaccuracy in the text identified through the OCR technique, and the partial matching model computes a level of matching between the text identified using the OCR error correction model and the label from amongst the plurality of labels; and extracting the label from the bounding box on determination of the level of matching between the text identified using the OCR error correction model and the label from amongst the plurality of labels being more than or equal to a predefined threshold;

identifying, from amongst the plurality of bounding boxes, a bounding box comprising label value corresponding to the label, the bounding box being one of the bounding boxes comprising the label text and a value matching data type criteria for the label in the bounding box and a neighboring bounding box containing value matching data type criteria in vicinity of the bounding box comprising the label text using a nearest proximity neighbor criteria;

predicting, via the one or more hardware processors, a bounding box comprising the label value associated with the label text using a deep learning model, the deep learning model trained with location information and data type criteria associated with the label values of the labels; and obtaining, via the one or more hardware processors, an aggregate confidence score for the text in the bounding box indicative of the text being a label value for the label in the bounding box, the aggregate confidence score obtained as a weighted sum of a confidence score (CPOS) of identification of position of the bounding box comprising label value in comparison with the position of label value obtained from deep learning model, a confidence score (CPROXIMITY) of the extracted value of the label in a neighboring bounding box, a confidence score (CSIZE) associated with size of the bounding box, and the COCR associated with the OCR.

2. The processor implemented method of claim 1, wherein the extraction profile comprises metadata fields to be extracted, label, synonyms for labels, valid data type for value of the labels, permitted pattern to be used for matching of the label value, and weights of coefficients used for calculating the aggregate confidence score.

3. The processor implemented method of claim 1, wherein the features of the bounding box utilized for training the deep learning model comprise Unique ID (UID), image contained in the bounding box, location, size, Centroid location, Centroid angle, Text contained, Type of text contained, OCR confidence score of each word present in text contained in bounding box.

4. The processor implemented method of claim 1, further comprising determining value of the label on determination of absence of the label text in the bounding box, wherein determining the value of label comprises applying a trained deep learning model to predict location of a value field.

5. The processor implemented method of claim 1, further comprising determining whether the bounding box comprises text more than the label text, and determining the label value by performing one of:

on determination of the presence of the text more than the label text in the bounding box, identifying whether text present in the bounding box includes label value present next to the label text matching the data type of label value;

on determination of the absence of the text more than the label text in the bounding box, determining presence of the text associated with the label in the neighboring bounding boxes.

6. The processor implemented method of claim 1, wherein the confidence score of identification of position of the bounding box comprising value with respect to position of bounding box comprising label text is determined based on:

$$C_{PROXIMITY} = \begin{cases} e^{-\left(\frac{x_{proximitydistance}}{width_{page}}\right)}, & associationtype\ in\lfloor right, left \rfloor \\ e^{-\left(\frac{y_{proximitydistance}}{height_{page}}\right)}, & associationtype\ in\lfloor top, down \rfloor \end{cases}$$

where, $x_{proximitydistance}$=distance in x axis direction between x coordinates of centroids of bounding boxes comprising label and value $y_{proximitydistance}$=distance in y axis direction between y coordinates of centroids of bounding boxes comprising label and value $width_{page}$=width of the page $height_{page}$=height of the page.

7. The processor implemented method of claim 1, wherein the confidence score associated with the size of the bounding box is computed as:

$$C_{SIZE} = \frac{e^{-\left(\frac{|width_m - width|}{max(width_m, width)}\right)} + e^{-\left(\frac{|height_m - height|}{max(height_m, height)}\right)}}{2}$$

where, $width_m$=Mean of the width taken from the trained deep learning model for the label value $height_m$=Mean of the width taken from the trained deep learning model for the label value width=Width of the bounding box comprising the label value heigth=Height of the bounding box comprising the label value.

8. The processor implemented method of claim 1, wherein the confidence score for a value of a label using position of the bounding box comprising the label value with respect to the position of bounding box using trained deep learning model is computed as:

$$C_{POS} = \frac{e^{-\left(\frac{|y_{mcat} - y|}{max(y_{mcat}, y)}\right)} + e^{-\left(\frac{|x_{mcat} - x|}{max(x_{mcat}, x)}\right)}}{2}$$

where $y_{mcat}$=mean of y coordinates for centroids of bounding boxes comprising the label value and stored in the deep learning model for a plurality of processed page images for given category y=y position of the centroid of the bounding box taken from the page image given for processing $x_{mcat}$=mean of x coordinates for centroids of bounding boxes comprising the label value stored in the deep learning model for plurality of processed page images for given category x=x position of the centroid of the bounding box taken from the page images given for processing.

9. The processor implemented method of claim 1, wherein the aggregate confidence score for the label value is calculated using below formula:

$$C_{AGG} = \frac{a * C_{OCR} + b * C_{POS} + c * C_{PROXIMITY} + d * C_{SIZE}}{a + b + c + d}$$

(Where $a, b, c, d \geq 0$)

$C_{AGG}$=Final Aggregate Confidence score for the label value, $0 <= C_{AGG} <= 1$ a, b, c, d=coefficient weights assigned to individual confidence scores.

10. A system for determining label value for labels in unstructured documents, comprising:
one or more memories; and
one or more hardware processors, the one or more memories coupled to the one or more hardware processors, wherein the one or more hardware processors are configured to execute programmed instructions stored in the one or more memories, to:
define an extraction profile comprising a set of labels for which label values are to be extracted from the unstructured document;
identify a plurality of sections in one or more page images of the unstructured document, each section of the plurality of sections identified based on one or more image processing techniques;
generate a plurality of bounding boxes in the one or more page images, each of the plurality of bounding boxes enclosing a section of the plurality of sections;
obtain a label value for each label from amongst the plurality of labels stored in the extraction profile, wherein obtaining the label value for each label comprises:
extract the plurality of labels, wherein extracting a label comprises performing for each bounding box of the plurality of bounding boxes:
extract text comprised in the bounding box, features of the bounding box and an Optical character recognition (OCR) confidence score ($C_{OCR}$) associated with the text based on a confidence score associated with each word of the text using an OCR technique;
determine whether a label text for a label from amongst the plurality of labels is present in the bounding box, the label text for the label comprising one of a label name and one or more synonyms for the label name;
on determination of absence of the label in the bounding box, apply an OCR error correction model and a partial matching model, wherein the OCR error correction model utilizes a minimum distance technique to identify inaccuracy in the text identified through the OCR technique, and the partial matching model computes a level of matching between the text identified using the OCR error correction model and the label from amongst the plurality of labels; and
extract the label from the bounding box on determination of the level of matching between the text identified using the OCR error correction model and the label from amongst the plurality of labels being more than or equal to a predefined threshold;
identify, from amongst the plurality of bounding boxes, a bounding box comprising label value corresponding to the label, the bounding box being one of the bounding boxes comprising the label text and a value matching data type criteria for the label in the bounding box and a neighboring bounding box containing value matching data type criteria in vicinity of the bounding box comprising the label text using a nearest proximity neighbor criteria;

predict a bounding box comprising the label value associated with the label text using a deep learning model, the deep learning model trained with location information and data type criteria associated with the label values of the labels; and obtain an aggregate confidence score for the text in the bounding box indicative of the text being a label value for the label in the bounding box, the aggregate confidence score obtained as a weighted sum of a confidence score ($C_{POS}$) of identification of position of the bounding box comprising label value in comparison with the position of label value obtained from deep learning model, a confidence score ($C_{PROXIMITY}$) of the extracted value of the label in a neighboring bounding box, a confidence score ($C_{SIZE}$) associated with size of the bounding box, and the $C_{OCR}$ associated with the OCR.

11. The system of claim 10, wherein the extraction profile comprises metadata fields to be extracted, label, synonyms for labels, valid data type for value of the labels, permitted pattern to be used for matching of the label value, and weights of coefficients used for calculating the aggregate confidence score.

12. The system of claim 10, wherein the features of the bounding box utilized for training the deep learning model comprises unique ID (UID), image contained in the bounding box, location, size, Centroid location, Centroid angle, Text contained, Type of text contained, OCR confidence score of each word present in text contained in bounding box.

13. The system of claim 10, wherein the one or more hardware processors are configured by the instructions to determine value of the label on determination of absence of the label text in the bounding box, wherein determining the value of label comprises applying a trained deep learning model to predict location of the value field.

14. The system of claim 10, wherein the one or more hardware processors are configured by the instructions to determine whether the bounding box comprises text more than the label text, and wherein to determine the label value, the one or more hardware processors are configured by the instructions to:
- on determination of the presence of the text more than the label text in the bounding box, identify whether text present in the bounding box includes label value present next to the label text matching the data type of label value;
- on determination of the absence of the text more than the label text in the bounding box, determine presence of the text associated with the label in the neighboring bounding boxes.

15. The system as claimed in claim 10, wherein the confidence score of identification of position of the bounding box containing value with respect to position of bounding box containing label text is determined based on:

$$C_{PROXIMITY} = \begin{cases} e^{-\left(\frac{x_{proximitydistance}}{width_{page}}\right)}, & associationtype \in \lfloor right, left \rfloor \\ e^{-\left(\frac{y_{proximitydistance}}{height_{page}}\right)}, & associationtype \in \lfloor top, down \rfloor \end{cases}$$

where,
$x_{proximitydistance}$=distance in x axis direction between x coordinates of centroids of bounding boxes comprising label and label value
$y_{proximitydistance}$=distance in y axis direction between y coordinates of centroids of bounding boxes comprising label and label value
$width_{page}$=width of the page image
$height_{page}$=height of the page image.

16. The system as claimed in claim 10, wherein the confidence score associated with the size ($C_{SIZE}$) of the bounding box is computed as:

$$C_{SIZE} = \frac{e^{-\left(\frac{|width_m - width|}{max(width_m, width)}\right)} + e^{-\left(\frac{|height_m - height|}{max(height_m, height)}\right)}}{2}$$

Where,
$width_m$=Mean of the width taken from the trained deep learning model for label value
$height_m$=Mean of the width taken from the trained deep learning model for label value
width=Width of the bounding box comprising the label value in consideration
heigth=Height of the bounding box comprising the label value.

17. The system as claimed in claim 10, wherein the confidence score for the label value using position ($C_{POS}$) of the bounding box comprising the label value with respect to the position of bounding box using trained deep learning model is computed as:

$$C_{POS} = \frac{e^{-\left(\frac{|y_{mcat} - y|}{max(y_{mcat}, y)}\right)} + e^{-\left(\frac{|x_{mcat} - x|}{max(x_{mcat}, x)}\right)}}{2}$$

where
$y_{mcat}$=mean of y coordinates for centroids of bounding boxes comprising value for the label and stored in the deep learning model for a plurality of processed page images for given category
y=y position of the centroid of the bounding box taken from the page image given for processing
$x_{mcat}$=mean of x coordinates for centroids of bounding boxes comprising value for the given label stored in the deep learning model for plurality of processed page images for given category
x=x position of the centroid of the bounding box taken from the page images given for processing.

18. The system as claimed in claim 10, wherein the aggregate confidence score for the label value is calculated is computed using below equation:

$$C_{AGG} = \frac{a * C_{OCR} + b * C_{POS} + c * C_{PROXIMITY} + d * C_{SIZE}}{a + b + c + d}$$

(Where $a, b, c, d \geq 0$)

$C_{AGG}$=Final Aggregate Confidence score for value of label, $0 <= C_{AGG} <= 1$
a, b, c, d=coefficient weights assigned to individual confidence scores.

19. One or more non-transitory machine readable information storage mediums comprising one or more instructions which when executed by one or more hardware processors cause:

defining, via the one or more hardware processors, an extraction profile comprising a set of labels for which label values are to be extracted from the unstructured document;

identifying, via the one or more hardware processors, a plurality of sections in one or more page images of the unstructured document, each section of the plurality of sections identified based on one or more image processing techniques;

generating, via the one or more hardware processors, a plurality of bounding boxes in the one or more page images, each of the plurality of bounding boxes enclosing a section of the plurality of sections;

obtaining, via the one or more hardware processors, a label value for each label from amongst the plurality of labels stored in the extraction profile, wherein obtaining the label value for each label comprises:

extracting the plurality of labels, via the one or more hardware processors, wherein extracting a label comprises performing for each bounding box of the plurality of bounding boxes:

extracting text comprised in the bounding box, features of the bounding box, and an Optical character recognition (OCR) confidence score ($C_{OCR}$) associated with the text based on a confidence score associated with each word of the text using an OCR technique;

determining whether a label text for a label from amongst the plurality of labels is present in the bounding box, the label text for the label comprising one of a label name and one or more synonyms for the label name;

on determination of absence of the label in the bounding box, applying an OCR error correction model and a partial matching model, wherein the OCR error correction model utilizes a minimum distance technique to identify inaccuracy in the text identified through the OCR technique, and the partial matching model computes a level of matching between the text identified using the OCR error correction model and the label from amongst the plurality of labels; and extracting the label from the bounding box on determination of the level of matching between the text identified using the OCR error correction model and the label from amongst the plurality of labels being more than or equal to a predefined threshold;

identifying, from amongst the plurality of bounding boxes, a bounding box comprising label value corresponding to the label, the bounding box being one of the bounding boxes comprising the label text and a value matching data type criteria for the label in the bounding box and a neighboring bounding box containing value matching data type criteria in vicinity of the bounding box comprising the label text using a nearest proximity neighbor criteria;

predicting, via the one or more hardware processors, a bounding box comprising the label value associated with the label text using a deep learning model, the deep learning model trained with location information and data type criteria associated with the label values of the labels; and obtaining, via the one or more hardware processors, an aggregate confidence score for the text in the bounding box indicative of the text being a label value for the label in the bounding box, the aggregate confidence score obtained as a weighted sum of a confidence score ($C_{POS}$) of identification of position of the bounding box comprising label value in comparison with the position of label value obtained from deep learning model, a confidence score ($C_{PROXIMITY}$) of the extracted value of the label in a neighboring bounding box, a confidence score ($C_{SIZE}$) associated with size of the bounding box, and the $C_{OCR}$ associated with the OCR.

* * * * *